(12) United States Patent
Varkey

(10) Patent No.: US 7,496,258 B1
(45) Date of Patent: Feb. 24, 2009

(54) HYDROCARBON MONITORING CABLE

(75) Inventor: Joseph Varkey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/937,722

(22) Filed: Nov. 9, 2007

(51) Int. Cl.
*G02B 6/44* (2006.01)

(52) U.S. Cl. ........................... 385/101; 385/100
(58) Field of Classification Search .................. None
See application file for complete search history.

(56) References Cited

U.S. PATENT DOCUMENTS

| 5,455,881 | A | 10/1995 | Bosisio et al. | |
|---|---|---|---|---|
| 6,690,866 | B2 | 2/2004 | Bonja et al. | |
| 6,907,170 | B1 | 6/2005 | Maida, Jr. | |
| 7,218,820 | B2 | 5/2007 | Maida, Jr. | |
| 2005/0281517 | A1 * | 12/2005 | Wessels et al. | 385/109 |
| 2006/0182398 | A1 * | 8/2006 | Dowd et al. | 385/100 |

* cited by examiner

*Primary Examiner*—Sung H Pak
(74) *Attorney, Agent, or Firm*—Michael Flynn; David Cate; Jaime Castano

(57) ABSTRACT

A hydrocarbon monitoring cable including resistance to development of defects in a fiber optic core thereof. The core defect resistance may be in the form of resistance to defect causing agents of a downhole environment such as hydrogen. This may be obtained through the use of a carbon layer about the fiber optic core. However, in light of the differing coefficients of thermal expansion between such a carbon layer and an outer polymer jacket, an intermediate polymer layer of a third coefficient of thermal expansion may be disposed between the carbon and jacket layers. Thus, the intermediate polymer layer may be of a third coefficient of thermal expansion selected so as to avoid fiber optic defect causing thermal expansion from the downhole environment itself. Additionally, the monitoring cable may include an electrically conductive layer about the fiber optic core that is positively charged to repel other positively charged fiber optic defect causing agents of the downhole environment. Furthermore, a polymer-based absorbing layer for absorbing such defect causing agents may be disposed about the fiber optic core for protection.

23 Claims, 4 Drawing Sheets

HYDROCARBON MONITORING CABLE

FIELD

Embodiments described relate to hydrocarbon monitoring cables for monitoring of downhole conditions in a hydrocarbon well. In particular, embodiments of hydrocarbon monitoring cables are described that are configured for placement and relatively continuous monitoring of the well over an extended period of time, perhaps between about 1½ and 5 years.

BACKGROUND

A variety of hydrocarbon applications involve the use of cables disposed within a hydrocarbon well. For example, a hydrocarbon cable may be positioned within a well during hydrocarbon production from the well so as to monitor well conditions during the production. A fiber optic core may be present through the cable in order to obtain well condition information such as temperature. In fact, due to the nature of fiber optics a temperature profile of the well may be acquired, with readings from each point along the fiber optic core. Such information may be employed to extrapolate production data useful in the production application. For example, estimates of flow-rate may be calculated by examination of temperature differentials across a temperature profile acquired by such a hydrocarbon monitoring cable.

When employing a hydrocarbon monitoring cable as noted above, the cable may be left in place along several thousand feet of the well and exposed to the environment of the hydrocarbon well for an extended period of time. For example, hydrocarbon production may take place over the course of about 1½ to 5 years with an attempt to leave the cable in place for the duration. In this manner, real-time monitoring of well conditions may be employed. As such, the production application may be modified in accordance with changing conditions within the well.

Unfortunately, prolonged exposure of a hydrocarbon monitoring cable to downhole conditions within the well may leave the fiber optic core susceptible to the formation of defects therein, thus affecting its performance. This may result from exposure to certain downhole substances which behave as fiber-optic defect causing agents leading to optical imperfections within the fiber optic core. For example, hydrogen, present in abundance within an active hydrocarbon well, is prone to attenuate into the fiber optic core reacting with the glass material thereof to form damaging hydroxyl groups. This in turn will lead to internal cracking and deterioration of the fiber optic core resulting in scattering of signal transmissions therethrough. This process may be accelerated by the high temperature of the downhole environment, eventually rendering the cable useless for fiber optic monitoring and communication. In fact, the fiber optic core is generally of a loop configuration, carrying a light signal downhole and providing a return path uphole for measurement and analysis at the well surface. Thus, the opportunity for the formation of such defects along the path of the fiber optic core is twofold from the perspective of the length of the cable.

In order to avoid attenuation of hydrogen or other fiber optic defect causing agents into the fiber optic core, the core may be surrounded by a host of coatings, gels, and/or metal layers acting as shields. A carbon coating, for example, may be particularly effective at shielding an underlying fiber optic core from hydrogen attack. Unfortunately, effective shielding of the underlying fiber optic core may leave the overall profile of the monitoring cable of an impractical size, perhaps occluding the well itself to a significant degree. Furthermore, such shielding may also leave the fiber optic core susceptible to thermally induced defects therein. That is, even where a reduced profile may be achievable, for example, with employment of a thin carbon coating, the addition of this shielding layer involves introduces a new material for the cable with its own coefficient of thermal expansion. This coefficient of thermal expansion for the newly introduced shielding material may not match that of other material layers surrounding the shielding material, such as a conductor layer or outer polymer jacket. As a result of the mismatching coefficients of thermal expansion between the shielding layer and other outer layers of the monitoring cable, mechanical stress may be experienced by the underlying fiber optic core. As a result, defects in the core may form as the cable is left for an extended period in the generally high temperature downhole environment of the well.

Regardless the type of shielding, the fiber optic capacity of a conventional hydrocarbon monitoring cable of practical sizing will generally be rendered useless in a matter of months if left in place for downhole monitoring. The high pressure, high temperature, hydrogen environment of a typical hydrocarbon well ultimately renders the cable ineffective for continuous fiber optic monitoring of downhole conditions throughout production.

SUMMARY

A hydrocarbon monitoring cable is provided for positioning in the downhole environment of a well. The cable includes a fiber optic core with a carbon layer thereabout to provide shielding from exposure to defect inducing agents of the downhole environment, namely hydrogen. The carbon layer itself has a first coefficient of thermal expansion whereas an outer polymer layer around the carbon layer is of a second coefficient of thermal expansion. An intermediate polymer layer of a third coefficient of thermal expansion is disposed between the carbon layer and the outer polymer layer. The intermediate polymer layer is selected based on the first and second coefficients of thermal expansion so as avoid fiber optic defect causing thermal expansion from the downhole environment.

In another embodiment, the hydrocarbon monitoring cable may include a fiber optic core with an electrically conductive layer thereabout. The electrically conductive layer may be positively charged to repel a fiber optic defect causing agent of the environment. Also, in yet another embodiment, the hydrocarbon monitoring cable may include a fiber optic core with a polymer-based absorbing layer disposed about said fiber optic core for absorbing a fiber optic defect causing agent of the environment. In particular, the polymer-based absorbing layer may include one of silica glass and carbon dispersed therethrough for the absorbing.

DETAILED DESCRIPTION

Embodiments are described with reference to certain hydrocarbon monitoring cables. Configurations of cables are described for long term placement and monitoring of well conditions within a hydrocarbon producing well. That said, a variety of configurations may be employed. Regardless, the particular embodiments described may include features for extending the useful life of a fiber optic core of the cable. This may be achieved in a number of ways, including by shielding, repelling or absorbing defect inducing agents away from the core. Additionally, the life of the core may be extended by reducing the effect of thermal mismatch between outer layers surrounding the core by the addition of an intermediate layer between such outer layers. The intermediate layer may be of a soft polymer having a coefficient of thermal expansion selected based on coefficients of thermal expansion of the outer layers as detailed herein below.

Figure 1:
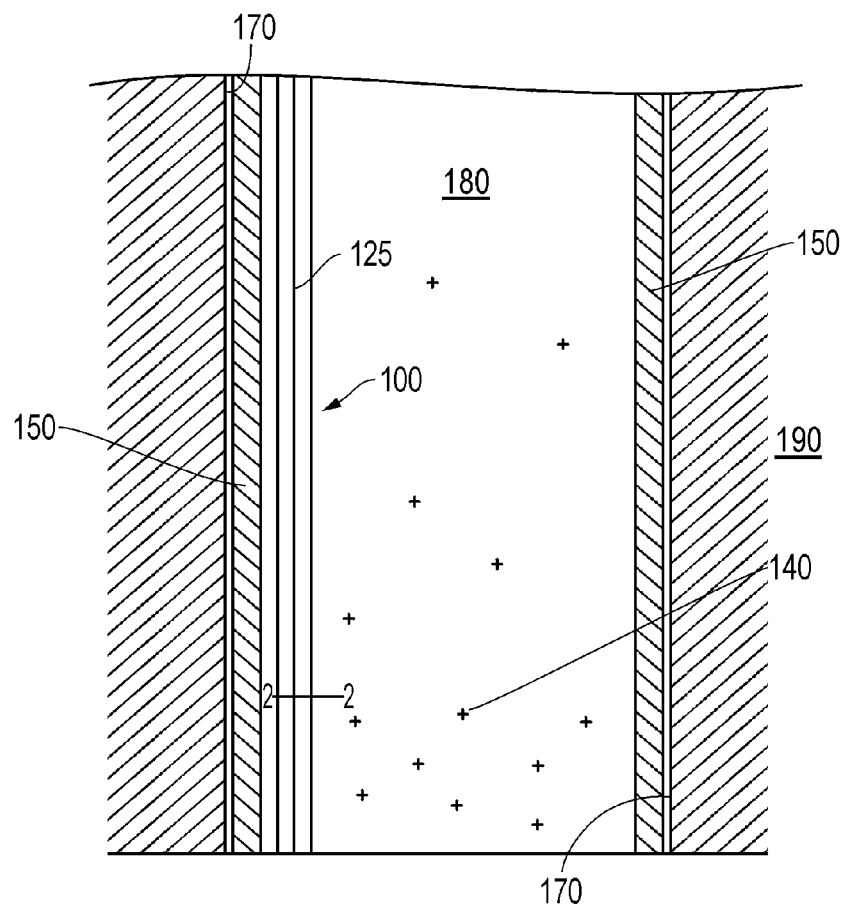
FIG. 1 is a side cross-sectional view of an embodiment of a hydrocarbon monitoring cable disposed within a well.

Referring now to FIG. 1, an embodiment of a hydrocarbon monitoring cable 100 is depicted within a hydrocarbon well 180. The well 180 may include a casing 150 adjacent a well wall 170 and traversing a geologic formation 190. When active, hydrocarbons may be produced from the formation 190 through the well 180. During such production, the hydrocarbon monitoring cable 100 may be coupled to surface equipment and employed to monitor the conditions of the well 180 in real-time. Information obtained from monitoring of the well 180 in this manner may then be employed dynamically to modify a well production application as needed, for example, in accordance with changing well conditions over time.

A fiber optic core 125 of the cable 100 may be employed in acquiring the above-noted well condition information. In fact, given the nature of fiber optics and the positioning of the cable 100 throughout the well 180, a dynamic profile of well conditions may be built from readings along each point of the fiber optic core 125. Temperature information in particular may be acquired and employed in this manner. For example, in one embodiment, estimates of flow-rate may be calculated by examination of temperature differentials across a temperature profile constructed by employment of such a hydrocarbon monitoring cable 100.

Continuing with reference to FIG. 1, the hydrocarbon monitoring cable 100 may be disposed through the well 180 to a depth of several thousand feet. The cable 100 may be left in position in this manner for an extended period of time, for example for the duration of the hydrocarbon production application. As indicated, this may result in the cable 100 being exposed to the environment of the hydrocarbon well 180 for between about 1½ to about 5 years as the hydrocarbons are extracted from the formation 190. Thus, the hydrocarbon monitoring cable 100, and in particular, its fiber optic core 125, may be exposed to pressure and temperature extremes as well as an abundance of hydrogen ions 140 or other defect causing agents. Indeed, the degree of these extremes and abundance of such agents may increase as the depth of the well 180 increases. Nevertheless, as described below, measures may be taken to help ensure the cable 100 and core 125 maintain adequate functionality for the monitoring period of up to about 5 years in spite of exposure to the indicated harsh downhole conditions.

The monitoring capacity of the hydrocarbon monitoring cable 100 may be extended to about 5 years as indicated due to built-in features thereof, keeping the rate of attenuation of hydrogen ions 140 to the fiber optic core 125 to a minimum. For example, in one embodiment the fiber optic core 125 may be about 10 km in length with a 100 dBm tolerance. That is, the core 125 may remain functional for monitoring purposes until attenuation reaches a level such that the communicative capacity of the core 125 is reduced by about 100 dBm. As such, embodiments detailed below may include shielding that slows the rate of attenuation of hydrogen ions 140 to the core 125 such that a reduction in communicative capacity of less than about 20 dBm per year occurs (e.g. helping to ensure a 5 year useful life of the cable 100).

Figure 2:
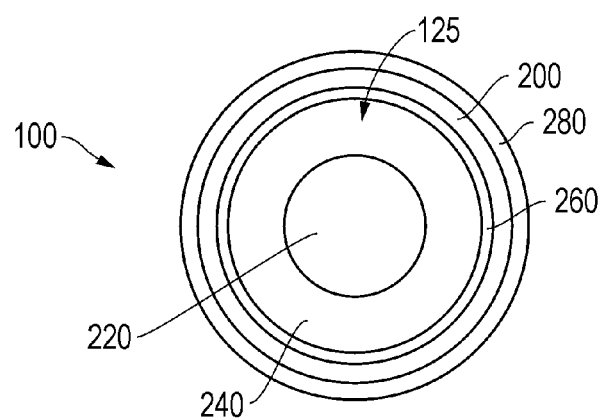
FIG. 2 is an enlarged cross-sectional view of the hydrocarbon monitoring cable of FIG. 1 taken from 2-2.

With added reference to FIG. 2, the fiber optic core 125 may be surrounded by a carbon layer 260 or coating configured to shield hydrogen ions 140 away from an inner core 220 and cladding 240 thereof. In this manner, the rate of attenuation of hydrogen into the core 125 may be reduced as indicated above. As such, the reaction of glass material of the core 125 with hydrogen ions 140 to form damaging hydroxyl groups may be minimized and delayed, thereby extending the life of the hydrocarbon monitoring cable 100.

In addition to the carbon layer 260, an outer polymer layer 280 or jacket may be provided to the hydrocarbon monitoring cable 100. As indicated, the carbon layer 260 may be configured with a focus on shielding the underlying core 125 from direct contact with hydrogen ions 140 or other defect inducing agents with the potential for attenuation into the cable 100. The outer polymer layer 280, however, may be configured in light of its more direct exposure to the overall environment of the well 180. As such, durability, moisture resistance, and other tailored characteristics of the outer polymer layer 280 may differ significantly from those of the carbon layer 260. As a result, the coefficient of thermal expansion of the outer polymer layer 280 may differ substantially from that of the carbon layer 260.

The above described difference in coefficients of thermal expansion may be significant given the temperature extremes likely to be encountered by the hydrocarbon monitoring cable 100 within the depths of the well 180. That is, the difference in the thermally expansive nature from one layer (e.g. 260) to the next (e.g. 280) may be quite pronounced as a result of the downhole exposure to temperature extremes. Nevertheless, as detailed below, the hydrocarbon monitoring cable 100 is equipped with an intermediate polymer layer 200 configured to minimize the stress of such differing coefficients of thermal expansion relative to the underlying fiber optic core 125. As such, thermally induced defects or microbending within the core 125 may be minimized and the life of the cable 100 extended.

Continuing with reference to FIG. 2, the intermediate polymer layer 200 is shown disposed between the outer polymer layer 280 and the carbon layer 260. The intermediate polymer layer 200 may be of a generally softer polymer than that of the outer polymer layer 280. The intermediate polymer layer 200 may also include a coefficient of thermal expansion chosen in light of the differing coefficients of thermal expansion of the adjacent layers 260, 280. For example, in one embodiment, the intermediate polymer layer 200 is of a coefficient of thermal expansion that is between that of the adjacent layers 260, 280. Thus, the intermediate polymer layer 200 may be able to accommodate expansion of the adjacent layers 260, 280 without significant resistance thereto. As a result, the stress of expansion of one adjacent layer (e.g. 280) is not significantly translated across the intermediate polymer layer 200 to the other adjacent layer (e.g. 260).

Due to the layering described above, the formation of cracks within the fiber optic core 125 brought on by the stress of nearby material layers 260, 280 of substantially differing thermal character, may be avoided. That is, by separating the outer polymer layer 280 from the carbon layer 260 with a thermally cooperative medium therebetween (i.e. the intermediate polymer layer 200), mechanical stress due to the differing thermally expansive characteristics of the layers 260, 280, may be substantially eliminated. As such, the fiber optic core 125 may be spared exposure to such mechanical stress, thereby extending the useful life of the cable 100.

As indicated, the carbon layer 260 is configured to shield the fiber optic core 125 to reduce direct contact with hydrogen ions 140. Thus, the carbon layer 260 is of a carbon based material with a predetermined coefficient of thermal expansion, perhaps less than about 10 ppm per degree Celsius. Alternatively, the outer polymer layer 280 may be of a hard polymer with a coefficient of thermal expansion greater than that of the carbon layer 260, perhaps exceeding about 30 ppm per degree Celsius. The intermediate polymer layer 200 may thus be of a soft polymer to accommodate thermal expansion of both the carbon layer 260 and the outer polymer layer 280 without translating significant expansive forces from one layer to the other as noted above.

A variety of materials may be employed for the intermediate and outer polymer layers 200, 280. In one embodiment, soft and hard versions of the same polymer type may be selected for the layers 200, 280. For example, the intermediate polymer layer 200 may be a soft polyimide whereas the outer polymer layer 280 may be of a hard polyimide. Similarly, the intermediate polymer layer 200 may be a soft acrylic whereas the outer polymer layer 280 may be of a hard acrylic. Other soft—hard polymer combinations may include soft and hard versions of ethylene propylene diene monomer rubber as well as soft and hard versions of a polyolefin. Alternatively, in another embodiment, the intermediate polymer layer 200 may be a soft silicone and the outer polymer layer 280 a fluoroplastic such as polyoxymethylene. Additionally, the soft polymer of the intermediate polymer layer 200 may be a fluoroelastomer, a perfluoroelastomer, and a perfluoroether.

Figure 3:
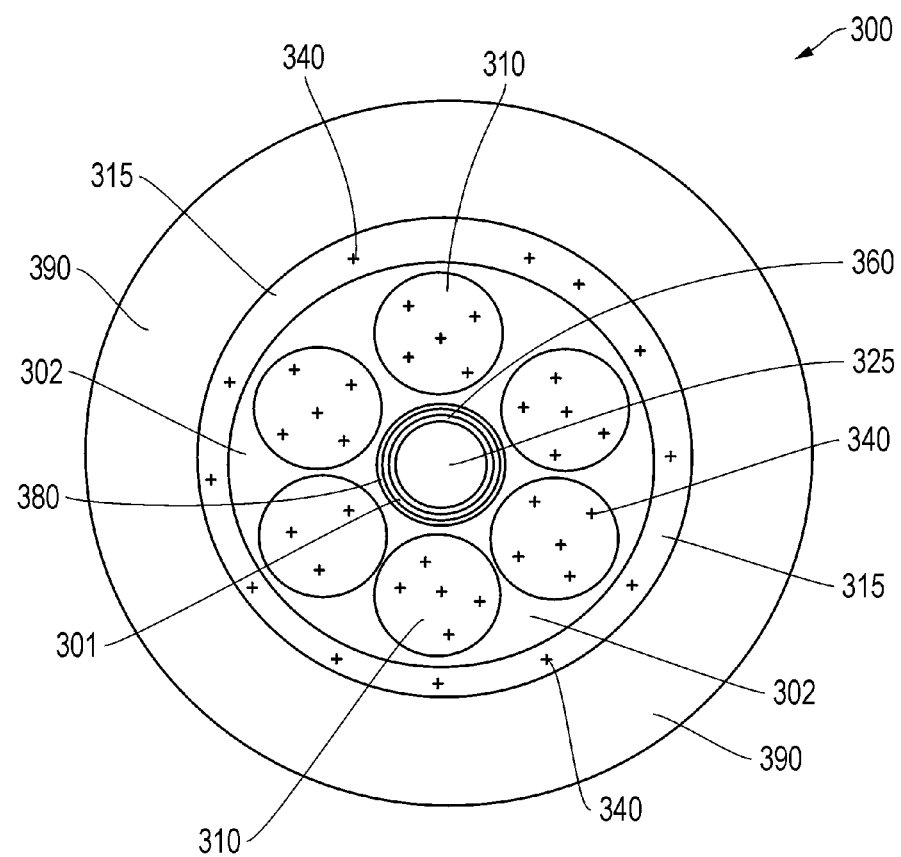
FIG. 3 is cross-sectional view of an alternate embodiment of a hydrocarbon monitoring cable.

Continuing now with reference to FIG. 3, a hydrocarbon monitoring cable 300 may include a layer of conductors 310, 315 for transferring power and electronic signals, for example, resistivity measurements therethrough. The conductors 310, 315 may also serve as reinforcing strength members for the cable 300, perhaps being strands helically wound about the fiber optic core 325 (as in the case of the depicted advancing conductors 310). In the embodiment shown, the conductors 310, 315 are of copper, copper coated steel, and/or nickel plated to withstand the corrosive downhole environment.

In the embodiment shown, the conductors 310, 315 are in the form of advancing conductors 310 and a return conductor ring 315 to provide electronic pathways through the cable 300. Such a configuration may include conductors 310, 315 contained by an external jacket 390 and suspended or isolated by a suspending polymer layer 302. Additionally, all of these features 310, 315, 302, 390, may be provided about an underlying construction of an outer polymer layer 380, intermediate polymer layer 301, carbon layer 360 and fiber optic core 325 similar to the embodiment of FIG. 2.

In the embodiment of FIG. 3, the conductors 310, 315 may be of a material having its own particular coefficient of thermal expansion which may differ significantly from the thermal coefficients of other material layers 360, 301, 380 of the cable 300. For example, the conductors 310, 315 may be of copper or copper coated steel whereas the material layers 360, 301, 380 may be of polymer and carbon materials as detailed above with reference to the embodiment of FIG. 2. Thus, in order to reduce stress, primarily on a fiber optic core 325, the suspending polymer layer 302 may be disposed adjacently about the conductors 310, 315. The suspending polymer layer 302 may be of a soft polymer and of a coefficient of thermal expansion selected based on that of an outer polymer layer 380 about the core 325 as well as that of the conductors 310, 315.

Separating the conductors 310, 315 from the outer polymer layer 380 with a thermally cooperative medium therebetween (i.e. the suspending polymer layer 302), reduces mechanical stress that might otherwise result from the differing thermally expansive characteristics of the conductors 310, 315 and the underlying outer polymer layer 380. That is, the suspending polymer layer 302 may be a soft polymer of a material type described with reference to the embodiment of FIG. 2. As a result, a reduction in the amount of mechanical stress translatable toward the fiber optic core 325 may be realized thereby also reducing mechanical stress and microbending defects within the core 325.

As indicated, with a configuration such as that of FIG. 3, a reduction in mechanical stress due to differing thermal characteristics between the conductors 310, 315 and the outer polymer layer 380 may be achieved. However, in the embodiment shown, a further reduction in mechanical stress may again be achieved by the inclusion of an intermediate polymer layer 301 between an outer polymer layer 380 and an underlying carbon layer 360 on the fiber optic core 325. That is, as with the embodiment of FIG. 2, the intermediate polymer layer 301 may serve as a medium between the carbon layer 360 and the outer polymer layer 380 thereby minimizing the effects of differing characteristics of thermal expansion therebetween. As a result, mechanical stress on the fiber optic core 325 may again be reduced.

A variety of material types may be selected for the intermediate polymer layer 301, the outer polymer layer 380, and the suspending polymer layer 302. For example, the intermediate polymer layer 301 and the outer polymer layer 380 may be of material types described above, in the embodiment of FIG. 2, for the intermediate polymer layer 200 and the outer polymer layer 280, respectively. Likewise, the suspending polymer layer 302 may be of the same soft polymer material as that of the intermediate polymer layer 301.

In one embodiment in particular, the fiber optic core 325 is shielded by a carbon layer 360 with a soft intermediate polymer layer 301 thereabout. A hard outer polymer layer 380 of the same polymer type as that of the intermediate polymer layer 301 is provided thereabout. The same soft polymer employed for the intermediate polymer layer 301 is similarly provided in the form of the suspending polymer layer 302 within which the conductors 310, 315 are isolated. Due to the soft mediums of the suspending polymer layer 302 and the intermediate polymer layer 301, a reduction in the formation of defects in the fiber optic core 325 due to differing thermal characteristics in material layers 360, 380 and conductors 310, 315 thereabout may be achieved.

Continuing with reference to FIG. 3, with added reference to FIG. 1, a further reduction in defects in the fiber optic core 325 may be achieved by employing conductors 310, 315 that are positively charged (as indicated by positive charges 340). That is, as indicated above, a hydrocarbon monitoring cable 300 may be equipped with conductors 310, 315 for carrying electronic signal therethrough. These conductors 310, 315 may be equipped with positive charges 340 by conventional means, for example, at the time of manufacture. In this manner, hydrogen ions 140 such as those depicted in FIG. 1 may be repelled away from the hydrocarbon monitoring cable 100. That is, the cable 100 may be equipped to repel hydrogen ions 140, at least to the extent of the amount of positive charge held by the conductors 310, 315.

In a configuration employing multiple types of conductors 310, 315, positive charge may be provided to selected conductors 310, 315 such as the advancing conductors 310 or the return conductor 315 alone. Alternatively, as in the embodiment of FIG. 3 all conductors 310, 315 may be equipped with positive charge 340 in order to maximize the amount of shielding available to the fiber optic core 325 from positively charged conductors 310, 315. Additionally, the size of the conductors 310, 315 may be determined in part based on the amount of charge to be accommodated. Similarly, the size and materials of the adjacently disposed electrically isolating layers (i.e. the external jacket 390 and the suspending polymer layer 302), may be determined based on the amount of charge accommodated by the conductors 310, 315.

Figure 4:
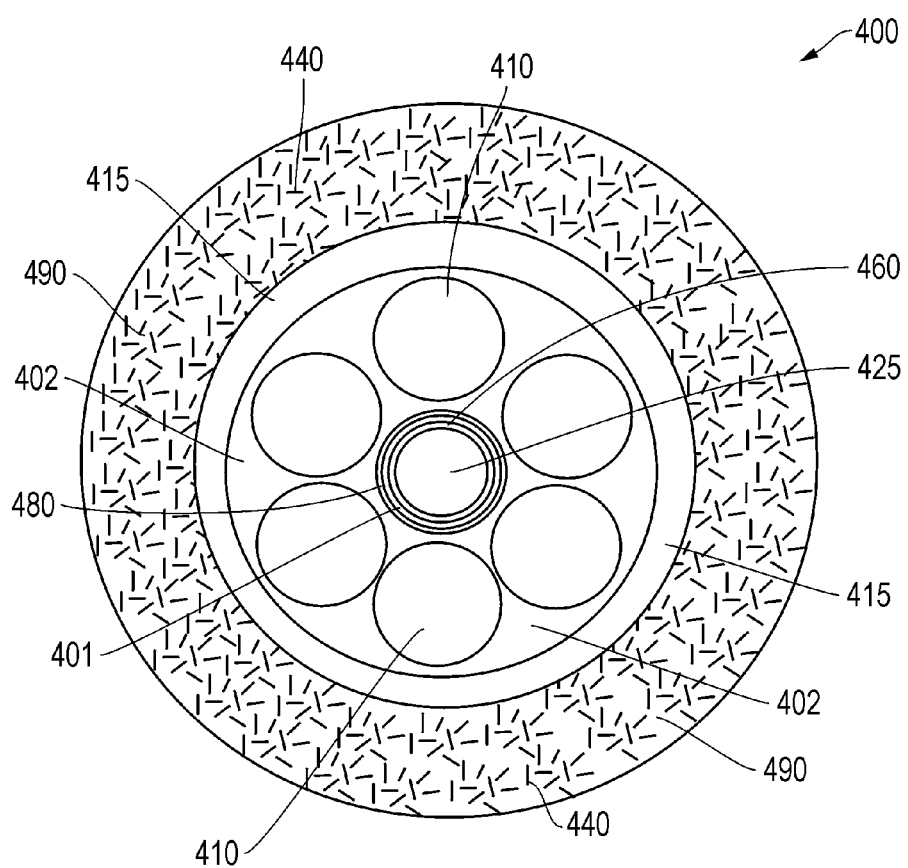
FIG. 4 is a cross-sectional view of yet another embodiment of a hydrocarbon monitoring cable.

Referring now to FIG. 4, an alternate embodiment of a hydrocarbon monitoring cable 400 is depicted. In the embodiment of FIG. 4, a layer of the cable 400 may be hydrogen absorbing in nature, for example through the use of glass or carbon. For example, in one embodiment, a polymer layer such as the external jacket 490, may be loaded with hydrogen absorbing agent 440. That is, as opposed to positive charges 340 as depicted in FIG. 3, a hydrogen absorbing agent 440 such as carbon nanotubes and/or carbon or glass fibers may be disbursed throughout the external jacket 490 or other polymer layer external to the fiber optic core 425. In this manner, hydrogen ions 140, such as those depicted in FIG. 1, may be absorbed, bonding with the agents 440, preventing their reaching the core 425. Additionally, the cable 400 may be equipped with conductors 410, 415 which may be charged in order to repel hydrogen ions 140 once the hydrogen absorbing agent 440 is saturated. Furthermore, in order to delay saturation, in one embodiment, the jacket 490 as well as the underlying suspending polymer layer 402, outer polymer layer 480, and intermediate polymer layer 401 as described below, may each accommodate hydrogen absorbing agent 440.

With added reference to FIG. 3, the cable 400 of FIG. 4 may again include a fiber optic core 425 that is protected by a carbon layer 460. Additionally, an intermediate polymer layer 401 may be provided interiorly adjacent an outer polymer layer 480 as a means of reducing the occurrence of microbendings within the core 425 due to mechanical stresses resulting from mismatched coefficients of thermal expansion as described above. As also detailed above, the cable 400 may be equipped with conductors 410, 415. In the embodiment shown, the conductors 410, 415 may be charged as detailed above in order to shield the underlying core 425 from exposure to hydrogen ions 140 (as shown in FIG. 1).

Embodiments of hydrocarbon monitoring cables 100, 300, 400 may employ additional features to those detailed above in order to increase the useful life thereof. For example, a tubular or ringed lead jacket may be employed in place of, or in addition to, the return conductor 315, 415 in order to provide additional hydrogen shielding. Additionally, the outermost layer of the cable 100, 300, 400 may include a steel based alloy incorporating iron, nickel-chromium, or other corrosion inhibitors relative to a downhole environment.

Figure 5:
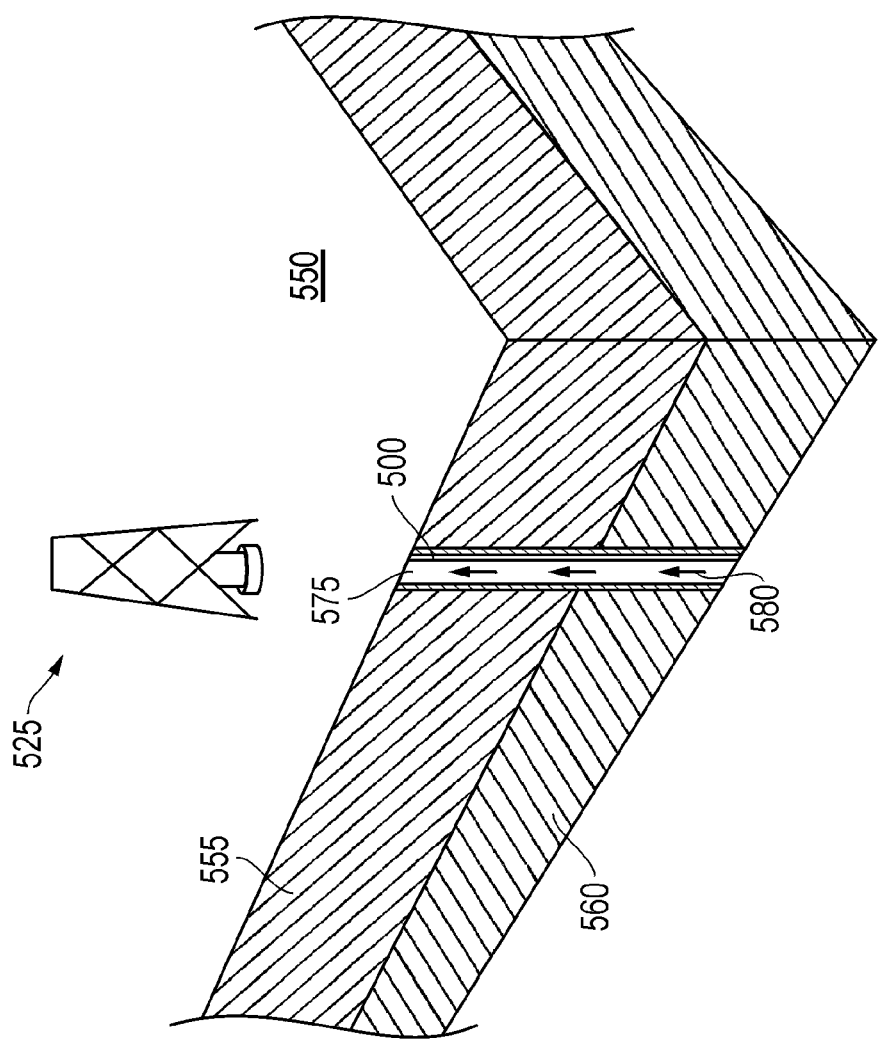
FIG. 5 is a partially cross-sectional overview of an embodiment of a hydrocarbon monitoring cable employed within a producing well at an oilfield.

Continuing now with reference to FIG. 5, a hydrocarbon monitoring cable 500 according to embodiments described above is employed within a productive well 575 for an extended duration without need for replacement. As shown, surface equipment 525 is positioned at an oilfield 550 above the well 575 and the cable 500 positioned therethrough as a hydrocarbon is extracted through formation layers 555, 560. Nevertheless, even with the production of the hydrocarbons (see hydrocarbon production arrows 580), the cable 500 may incorporate a fiber optic core assembly and yet, remain in place for the substantial duration of the hydrocarbon production, without need for replacement. That is, due to thermal compatibility and hydrogen shielding features detailed above, the fiber optic core of the hydrocarbon monitoring cable 500 may remain viable for an extended period of time, likely to cover the duration of the hydrocarbon production (e.g. up to about 5 years).

Embodiments of a hydrocarbon monitoring cable as described above include features for delaying the rate of attenuation of defect causing agents into the fiber optic core. Thus, optical imperfections within the core are kept to a minimum during monitoring of a production application with the cable. As a result, the integrity of fiber optic communication is maintained allowing measurements, analysis, and production itself to proceed without interruption for cable replacement. Additionally, this may be achieved in a manner that avoids the use of a high profile gel and metal layer configurations that tend to affect the available diameter of the well itself. Furthermore, features of the cable may be layered in such a manner so as to substantially avoid thermally induced defects within the core.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, a variety of manufacturing techniques may be employed for forming hydrocarbon monitoring cables according to embodiments described above. In one such example, absorbing agents may be mixed with fluid polymers prior to cable formation and later co-extruded during cable formation. Furthermore, the foregoing description should not be read as pertaining only to the precise structures described and shown in the accompanying drawings, but rather should be read as consistent with and as support for the following claims, which are to have their fullest and fairest scope.

I claim:

1. A hydrocarbon monitoring cable for positioning in a downhole environment, the hydrocarbon monitoring cable comprising:
   a fiber optic core;
   a carbon layer about said fiber optic core to provide shielding from exposure to a fiber optic defect causing agent of the downhole environment, said carbon layer having a first coefficient of thermal expansion;
   an outer polymer layer about said carbon layer and of a second coefficient of thermal expansion;
   an intermediate polymer layer disposed between said carbon layer and said outer polymer layer, said intermediate polymer layer having a third coefficient of thermal expansion selected based on the first and second coefficients of thermal expansion; and
   a positively charged electrically conductive layer about said outer polymer layer to repel a fiber optic defect causing agent of the downhole environment away from said fiber optic core.

2. The hydrocarbon monitoring cable of claim 1 wherein said fiber optic cable is configured to relay temperature information.

3. The hydrocarbon monitoring cable of claim 1 wherein the coefficient of thermal expansion of said carbon layer is less than about 10 ppm/° C. and the coefficient of thermal expansion of said outer polymer layer is greater than about 30 ppm/° C.

4. The hydrocarbon monitoring cable of claim 3 wherein the coefficient of thermal expansion of said intermediate polymer layer is between about 10 ppm/° C. and about 30 ppm/° C.

5. The hydrocarbon monitoring cable of claim 1 wherein the coefficient of thermal expansion of the intermediate polymer layer is less than the coefficient of thermal of expansion of the outer polymer layer and greater than the coefficient of thermal expansion of the carbon layer.

6. The hydrocarbon monitoring cable of claim 1 wherein said intermediate polymer layer is softer than said outer polymer layer.

7. The hydrocarbon monitoring cable of claim 6 wherein said intermediate polymer layer and said outer polymer layer include a polymer of the same type.

8. The hydrocarbon monitoring cable of claim 7 wherein the polymer is one of a polyimide, an acrylic, ethylene, polyolefin, and an ethylene propylene diene monomer rubber.

9. The hydrocarbon monitoring cable of claim 1 wherein said positively charged electrically conductive layer is configured to relay resistivity measurements.

10. The hydrocarbon monitoring cable of claim 1 wherein said positively charged electrically conductive layer comprises conductor strands helically wound about said fiber optic core.

11. The hydrocarbon monitoring cable of claim 10 wherein said conductor strands are one of copper, copper coated steel, and nickel plated.

12. The hydrocarbon monitoring cable of claim 10 wherein a size of said strands is determined based on an amount of charge to be accommodated thereby.

13. A hydrocarbon monitoring assembly comprising:
surface equipment for placement at an oilfield; and
a fiber optic cable according to claim 1 coupled to said surface equipment to provide well information thereto, the fiber optic cable comprising a fiber optic core and a positively charged electrically conductive layer about said fiber optic core to repel a fiber optic defect causing agent of the environment away from said fiber optic core.

14. The hydrocarbon monitoring assembly of claim 1 wherein the fiber optic defect causing agent is hydrogen.

15. A hydrocarbon monitoring cable for positioning in a downhole environment, the hydrocarbon monitoring cable comprising:
a fiber optic core; and
a positively charged electrically conductive layer about said fiber optic core to repel a fiber optic defect causing agent of the environment away from said fiber optic core.

16. The hydrocarbon monitoring cable of claim 15 wherein said positively charged electrically conductive layer is configured to relay resistivity measurements.

17. The hydrocarbon monitoring cable of claim 15 wherein said positively charged electrically conductive layer comprises conductor strands helically wound about said fiber optic core.

18. The hydrocarbon monitoring cable of claim 17 wherein said conductor strands are one of copper, copper coated steel, and nickel plated.

19. The hydrocarbon monitoring cable of claim 17 wherein a size of said strands is determined based on an amount of charge to be accommodated thereby.

20. The hydrocarbon monitoring cable of claim 15 further comprising a jacket about said electrically conductive layer, said jacket including an absorbing agent disposed therein for absorbing a fiber optic defect causing agent.

21. The hydrocarbon monitoring cable of claim 20 wherein said absorbing agent comprises one of glass, a carbon fiber, and carbon nanotubes.

22. The hydrocarbon monitoring assembly of claim 13 further comprising a jacket about said fiber optic core, said jacket including an absorbing agent disposed therein for absorbing a fiber optic defect causing agent.

23. The hydrocarbon monitoring cable of claim 1 further comprising a jacket about said conductive layer, said jacket including an absorbing agent disposed therein for absorbing a fiber optic defect causing agent.

* * * * *